United States Patent
Kerrisk et al.

(10) Patent No.: US 10,354,283 B2
(45) Date of Patent: *Jul. 16, 2019

(54) SYSTEMS AND METHODS FOR ADVERTISING

(71) Applicant: Unlockd Media Pty. Ltd., Williamstown, Victoria (AU)

(72) Inventors: Christopher Kerrisk, Newport (AU); Craig Watt, Williamstown (AU); Ajmer Singh, Uttarakhand (IN); Akhilesh Matura, Uttarakhand (IN)

(73) Assignee: Unlocked Media Pty Ltd., Williamstown, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,160

(22) Filed: Feb. 12, 2016

(65) Prior Publication Data

US 2016/0162951 A1 Jun. 9, 2016

Related U.S. Application Data

(63) Continuation of application No. 14/780,458, filed as application No. PCT/AU2014/000794 on Aug. 7, 2014.

(30) Foreign Application Priority Data

Aug. 7, 2013 (AU) .............................. 2013902962
Nov. 26, 2013 (AU) .............................. 2013101551

(51) Int. Cl.
*G06Q 30/02* (2012.01)
*H04W 12/08* (2009.01)
*H04L 29/08* (2006.01)

(52) U.S. Cl.
CPC ..... *G06Q 30/0267* (2013.01); *G06Q 30/0226* (2013.01); *G06Q 30/0261* (2013.01);
(Continued)

(58) Field of Classification Search
CPC .......... G06Q 30/0251; G06Q 30/0258; G06Q 30/0265; G06Q 30/0269; G06Q 30/0226;
(Continued)

(56) References Cited

U.S. PATENT DOCUMENTS

| | | | |
|---|---|---|---|
| 2002/0120925 A1* | 8/2002 | Logan ...................... | A23L 2/52 725/9 |
| 2003/0040970 A1* | 2/2003 | Miller .................... | G06Q 30/02 705/26.1 |

(Continued)

FOREIGN PATENT DOCUMENTS

| WO | WO2014/022347 | 2/2014 |
|---|---|---|
| WO | WO 2014/022437 | 2/2014 |

OTHER PUBLICATIONS

XDA Developers forum posting "Anyone else getting ad on unlock?", by Magnesus, dated Sep. 18, 2012.*

(Continued)

*Primary Examiner* — Scott D Gartland
(74) *Attorney, Agent, or Firm* — Nixon Peabody LLP

(57) ABSTRACT

The present disclosure is related to systems, methods, and/or processor readable media for presenting advertisements and/or other content. In certain embodiments, the disclosure relates to systems and/or methods for presenting advertisement and/or other content on mobile devices where advertisements and/or other content are displayed on the mobile device on unlocking of the device.

14 Claims, 9 Drawing Sheets

(52) U.S. Cl.
CPC ......... *G06Q 30/0277* (2013.01); *H04L 67/02* (2013.01); *H04W 12/08* (2013.01)

(58) Field of Classification Search
CPC ........... G06Q 30/0261; G06Q 30/0267; G06Q 30/0277
USPC .................... 705/14.27, 14.58, 14.64, 14.73
See application file for complete search history.

(56) References Cited

U.S. PATENT DOCUMENTS

| | | | | |
|---|---|---|---|---|
| 2003/0050837 | A1* | 3/2003 | Kim ................... | G06Q 30/0222 705/14.23 |
| 2004/0172340 | A1* | 9/2004 | Bishop ............... | G06Q 30/0269 705/50 |
| 2006/0253453 | A1* | 11/2006 | Chmaytelli ............ | G06Q 30/02 |
| 2008/0098420 | A1* | 4/2008 | Khivesara ............. | G06Q 30/02 725/32 |
| 2011/0238495 | A1* | 9/2011 | Kang ..................... | G06Q 30/02 705/14.49 |
| 2012/0259707 | A1 | 10/2012 | Thielke et al. | |
| 2013/0124276 | A1 | 5/2013 | Brown | |
| 2014/0019253 | A1* | 1/2014 | Ricasata ............ | G06Q 30/0241 705/14.64 |

OTHER PUBLICATIONS

Representational state transfer, from Wikipedia, downloaded Nov. 18, 2016 from https://en.wikipedia.org/w/index.php?title=Representational_state_transfer&oldid=506000470, dated Aug. 6, 2012 (hereinafter REST).*
Rodriguez, Alex, RESTful Web services: The basics, from IBM developerWorks, dated Nov. 6, 2006, downloaded from http://www.ibm.com/developerworks/webservices/library/ws-restful/—with header.*
Rodriguez, Alex, RESTful Web services: The basics, from IBM developerWorks, dated Nov. 6, 2006, downloaded from http://www.ibm.com/developerworks/webservices/library/ws-restful/—without header.*
JSON, from Wikipedia, dated Aug. 6, 2013 and downloaded from https://en.wikipedia.org/w/index.php?title=JSON&oldid=567426158 on Nov. 18, 2016 (Year: 2013).*
Introducing JSON, dated May 28, 2009, downloaded from https://web.archive.org/web/20090528022846/http://json.org/ on Jun. 19, 2018—with header (Year: 2009).*
Introducing JSON, dated May 28, 2009, downloaded from https://web.archive.org/web/20090528022846/http://json.org/ on Jun. 19, 2018—without header (Year: 2009).*
Using JSON in the Google Data Protocol, dated Sep. 29, 2012, downloaded from https://web.archive.org/web/20120929025520/https://developers.google.com/gdata/docs/json on Jun. 19, 2018—with header (Year: 2012).*
Using JSON in the Google Data Protocol, dated Sep. 29, 2012, downloaded from https://web.archive.org/web/20120929025520/https://developers.google.com/gdata/docs/json on Jun. 19, 2018—without header (Year: 2012).*
Using JSON with Yahoo! Web Services, dated Oct. 11, 2007, downloaded from http://web.archive.org/web/20071011085815/http://developer.yahoo.com/common/json.html—with header (Year: 2007).*
Using JSON with Yahoo! Web Services, dated Oct. 11, 2007, downloaded from http://web.archive.org/web/20071011085815/http://developer.yahoo.com/common/json.html—without header (Year: 2007).*
International Search Report dated Sep. 9, 2014 for PCT/AU2014/000793.
Perez, S., "Locket Puts Ads on Smartphone Lock Screens. Pays You to Use Your Phone", Jul. 18, 2013, retrieved from the Internet, URL: http://techcrunch.com/2013/07/18/locket-puts-ads-in-smartphone-lco-screens-pays-you=to-use-your-phone/, retrieved on Sep. 3, 2014.

* cited by examiner

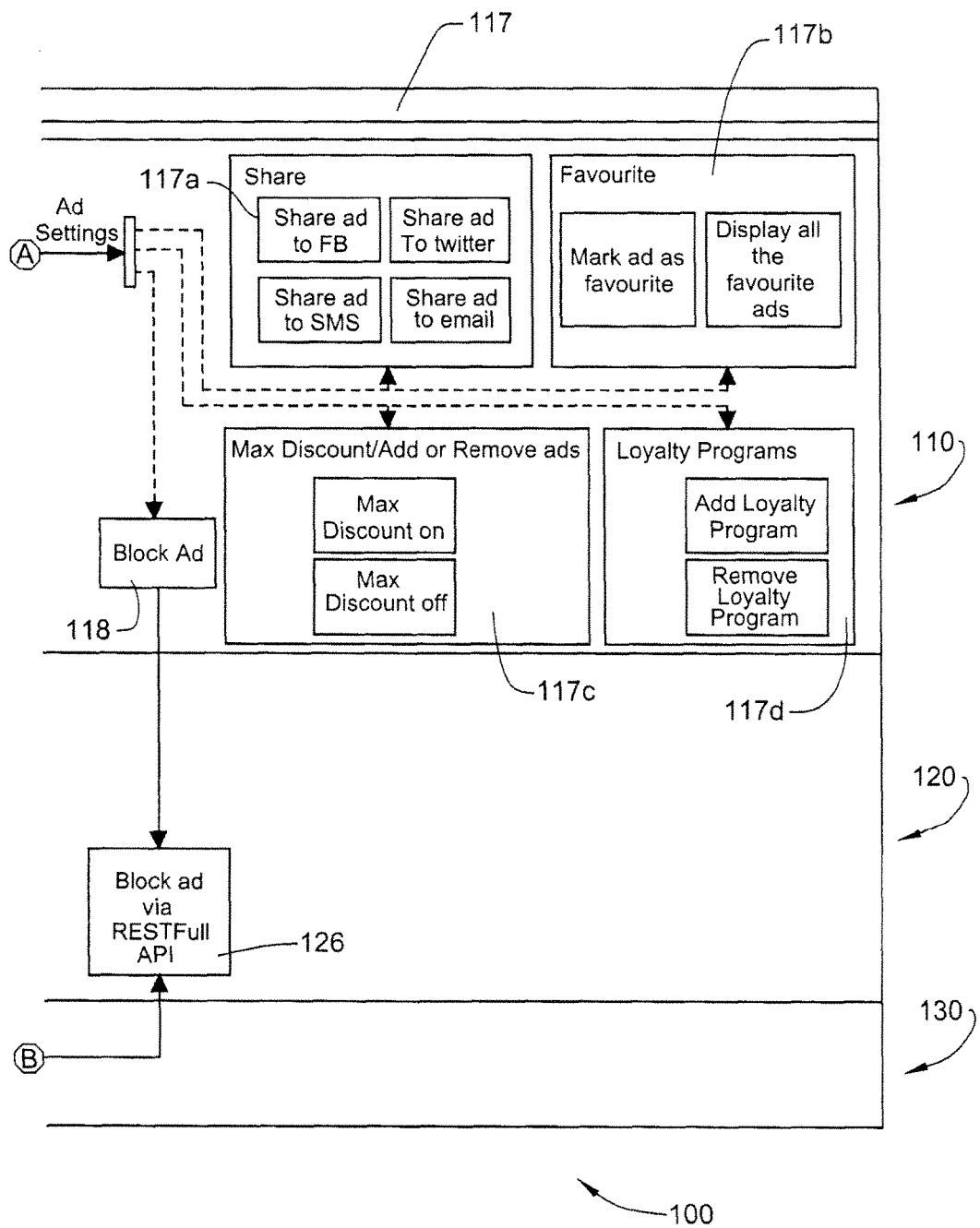

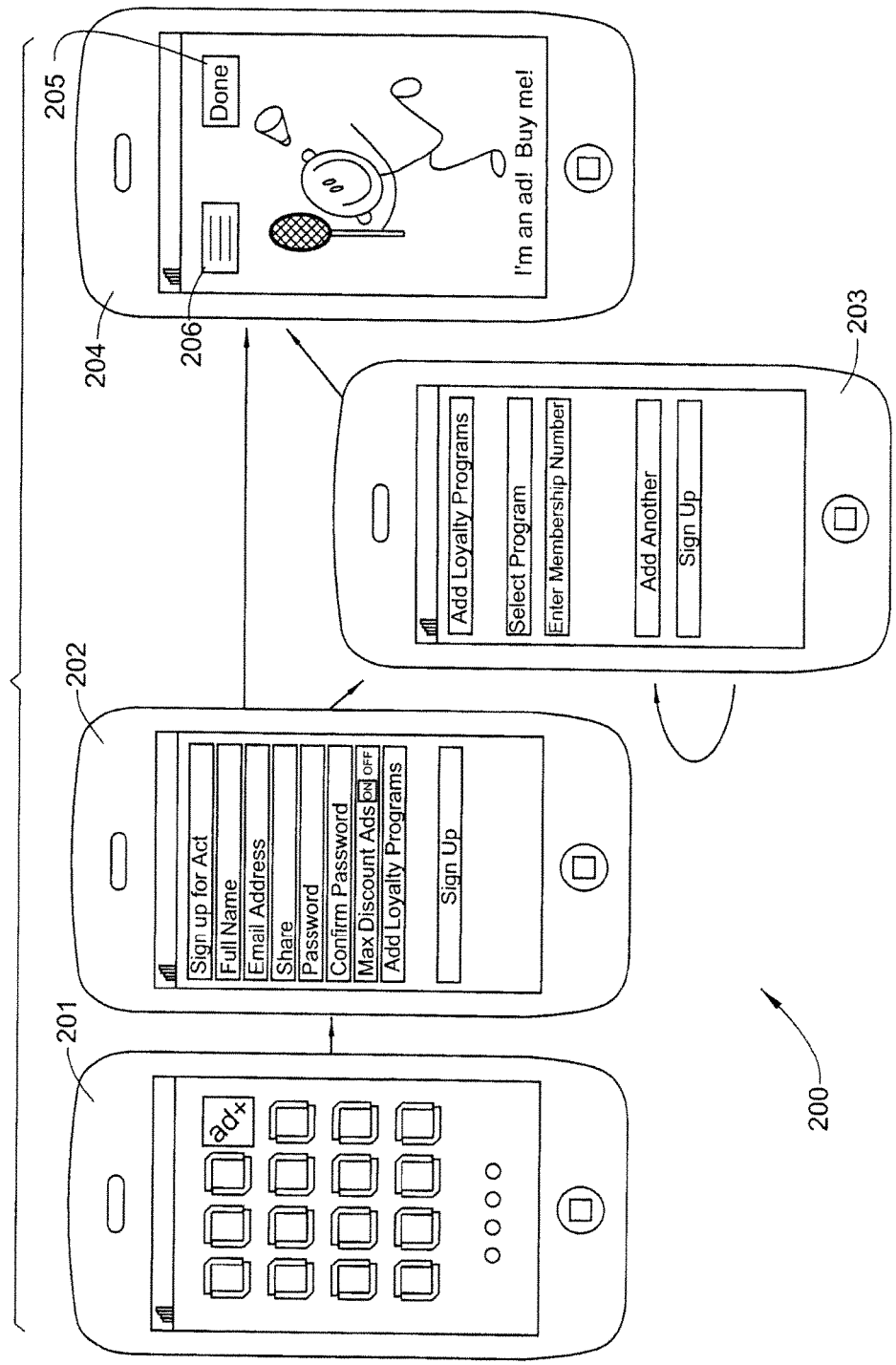

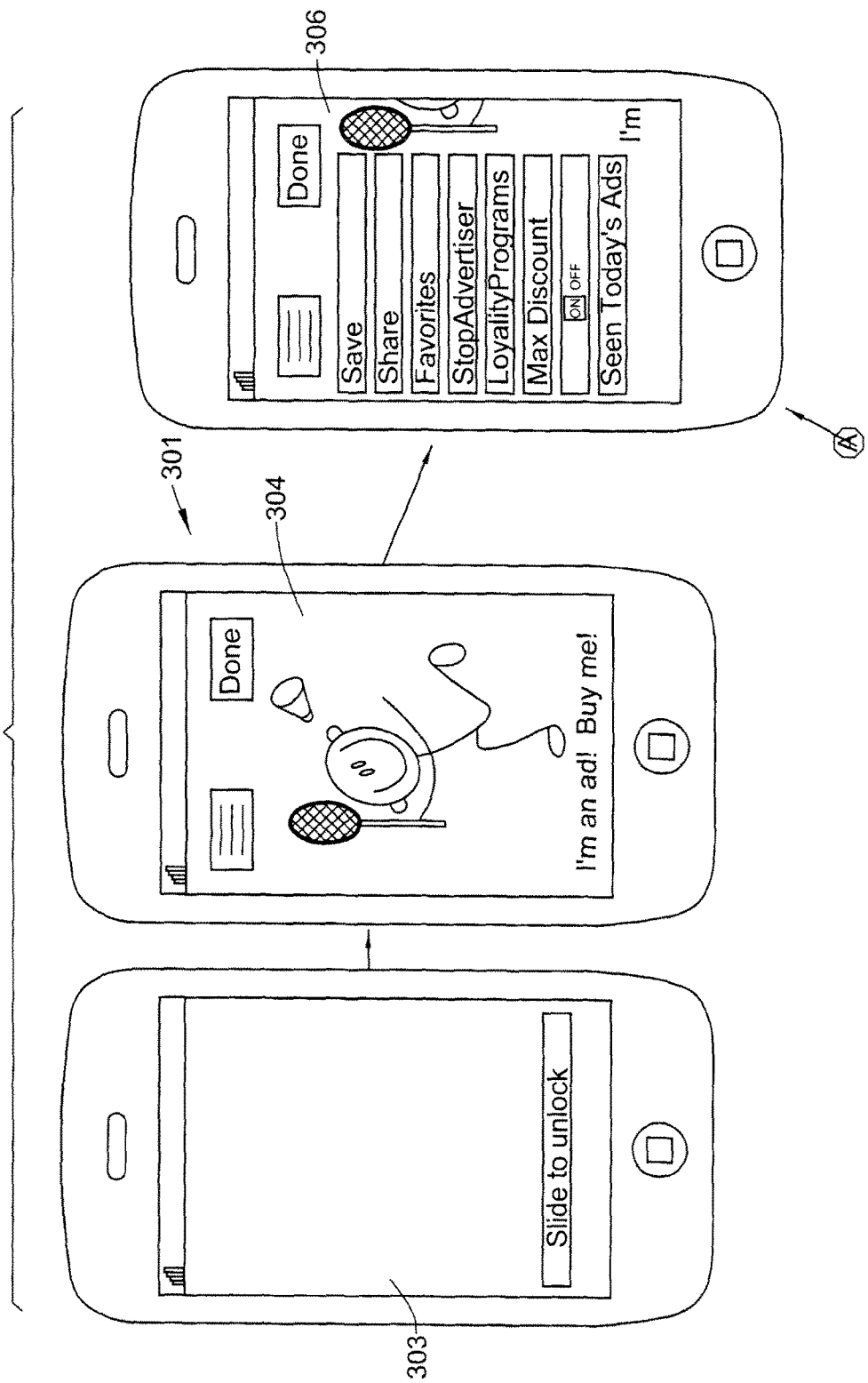

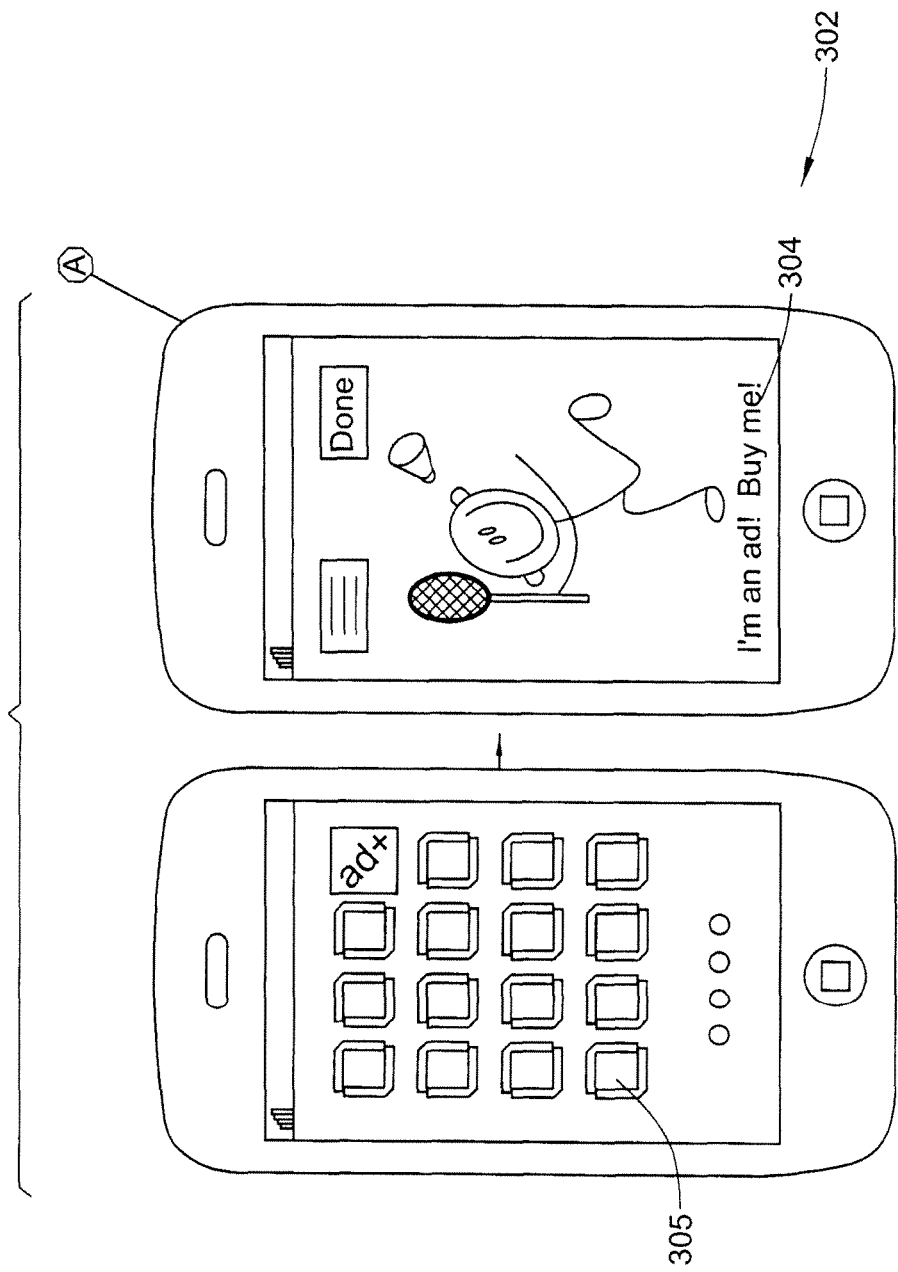

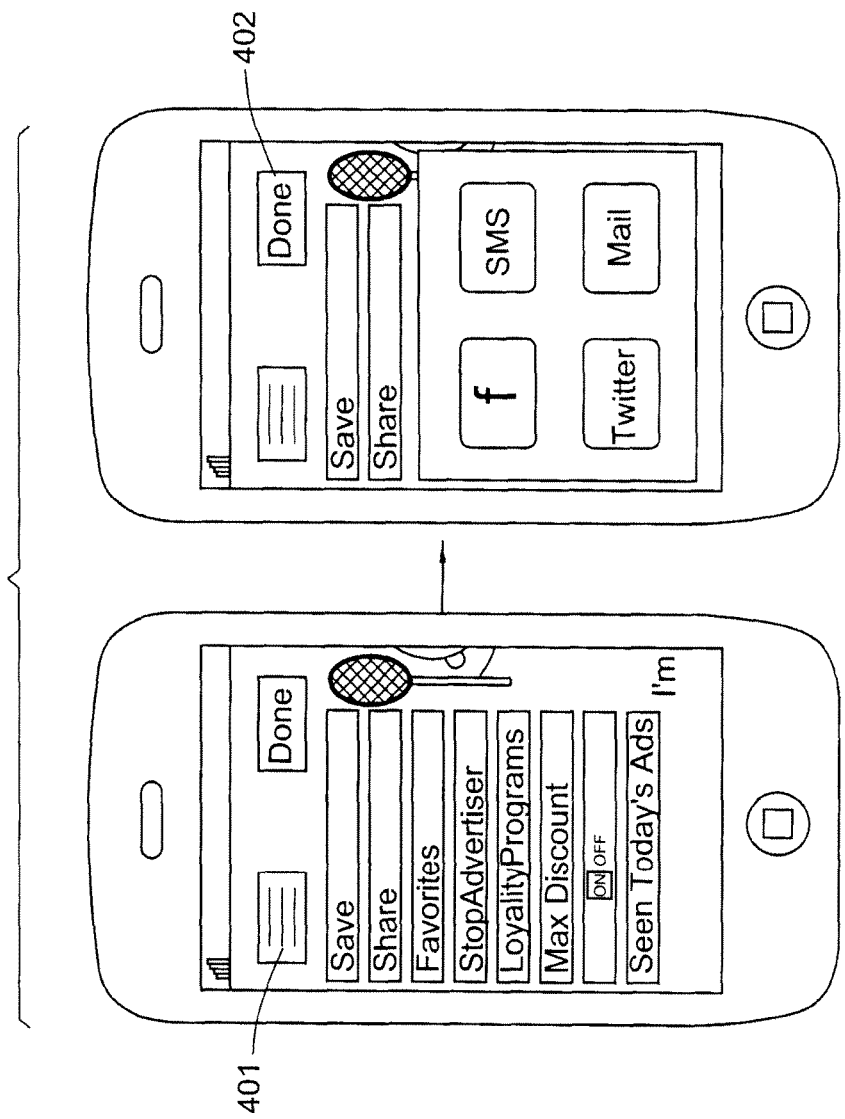

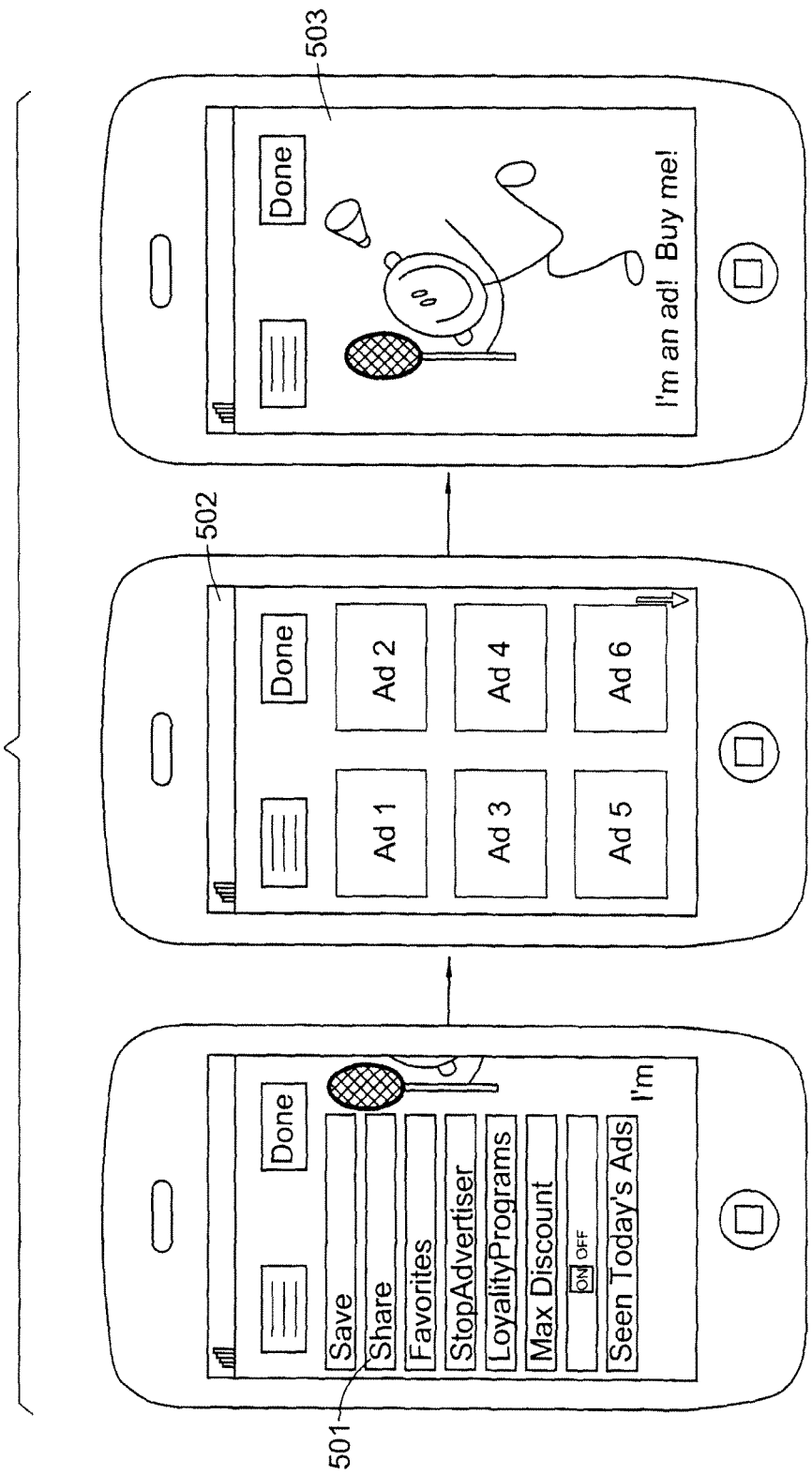

SYSTEMS AND METHODS FOR ADVERTISING

CROSS REFERENCE TO RELATED APPLICATIONS

This application is a continuation of U.S. application Ser. No. 14/780,458, filed Sep. 25, 2015, which is the National Phase application of International Application No. PCT/AU2014/000794, filed Aug. 7, 2014, which designates the United States and was published in English, and which claims priority to Australian Application No. 2013101551, filed Nov. 26, 2013, and Australian Application No. 2013902962, filed Aug. 7, 2013. Each of these applications, in its entirety, is incorporated herein by reference. Also incorporated by reference in its entirety is PCT Patent Application No. PCT/AU2014/000793, entitled "Systems, Devices and Methods for Displaying Digital Content on a Display" filed on 7 Aug. 2014.

FIELD

The present disclosure relates to systems and/or methods for advertising. In certain embodiments, the disclosure relates to systems and/or methods for advertising on mobile devices where advertisements are displayed on the mobile device on unlocking of the device prior to display of the homepage of the device.

BACKGROUND

The display of advertising material on mobile devices is, of course, known. For example, many companies advertise merchandise and special offers on sites available through mobile devices. Some retailers and serviced providers also provide Apps that advertise goods and services and facilitate purchase of those goods and services.

Other on-line retailers advertise special deals via email on mobile devices, providing links through to the deals and the opportunity to purchase the relevant goods or services.

In some markets, mobile advertising is most commonly seen as a Mobile Web Banner (top of page) or Mobile Web Poster (bottom of page banner), while in others, it is dominated by SMS advertising. Other forms of mobile advertising include MMS advertising, advertising within mobile games and mobile videos, during mobile TV receipt, full-screen interstitials, which appear while a requested item of mobile content or mobile web page is loading up, and audio advertisements that can take the form of a jingle before a voicemail recording, or an audio recording played while interacting with a telephone-based service such as movie ticketing or directory assistance.

The effectiveness of a mobile media ad campaign can be measured in a variety of ways. The main measurements are impressions (views) and click-through rates. They are also sold to advertisers by views (Cost Per Impression) or by click-through (Cost Per Click). Additional measurements include conversion rates, such as click-to-call rates and other degrees of interactive measurement.

Mobile media can run on a mobile web page or within a mobile application, often referred to as in-App.

One of the popular models in mobile advertising is Cost Per Install (CPI) where the pricing model is based on the user installing an App on their mobile phone. CPI Mobile Advertising Networks work either as incentive or non-incentive. In the incentive model the user is given virtual points or rewards to install the game or App.

It would be advantage if an alternative incentive-based advertising model could be devised that provides mobile device users with advertisement displays of high quality. More particularly, it would be advantageous if an advertising model could be devised that provides mobile device users options relating to advertisements received on their mobile device, for example in terms of category of goods or services, or in more specific terms of vendor, and so on.

The subject matter claimed herein is not limited to embodiments that solve one or more disadvantages or that operate only in environments such as those described above. Rather, this background is only provided to illustrate one exemplary technology area where some embodiments described herein may be practice.

Accordingly, systems and/or methods for solving these and other problems disclosed herein are desirable. The present disclosure is directed to overcome and/or ameliorate at least one of the disadvantages of the prior art as will become apparent from the discussion herein.

SUMMARY

According certain embodiments there is provided a system for advertising on a mobile device comprising:
a user interface facilitating entry of registration details of a user of the system and thereby registration of the user; and
application software adapted to retrieve an advertisement from an advertisement library stored on a database and display the advertisement on a screen of the mobile device,
wherein the application software is adapted to display the advertisement on the screen of the mobile device on unlocking of the screen, prior to the display of a homepage of the mobile device.

As used herein, the terms "on unlocking of the screen" includes within its scope immediate display of the advertisement when the screen of the mobile device is unlocked and display of the advertisement within a period of time after the screen is unlocked. That is, the term "on" should not be taken to limit the present invention to instantaneous display of the advertisement. Usual delays in processing and the like are also considered to fall within the ambit of these terms.

In certain embodiments, the advertisement may provide an incentive to the user of the system, for example in return for having the advertisement displayed on unlocking of the screen of the mobile device. That is, users of the system are incentivised to have advertisements displayed on their mobile devices on unlocking of their screens.

As used herein, the term "incentive" refers to any suitable type of incentive, including, but not limited to, one or more of the following: discounts, loyalty rewards and giveaways. That is, any suitable form of incentive that may incentivise the user to register on the system and opt in to receiving the advertisements. The incentives may or may not be available only to users who register on the system (i.e. system user only incentives).

Certain system embodiments, advantageously facilitates retrieval of an advertisement from the advertisement library and display of that advertisement on unlocking of the mobile device by the user. As discussed herein, the application software may facilitate turning this function off. That is, a user may be able to opt out of receiving advertisements on unlocking their mobile device. As such, an advertisement may also be retrieved from the advertisement library and displayed on the screen on launching the application software.

In certain embodiments, when a user opts in to receiving advertisements on unlocking of the screen of their mobile device, equating to a premium user of the system, a plurality of advertisements are pushed to the mobile device at a predetermined time, for example overnight. The advertisements may then be stored on the mobile device and accessed each time, or a predetermined number of times, the user unlocks the screen of the device on the following day. This embodiment may provide commercial advantages as the speed of display of the advertisements on unlocking of the screen may be improved or potentially dramatically improved, and internet connectivity may not be required to display the advertisements (i.e. as the advertisements are queued on the mobile device). According to this embodiment, if desired, a user may opt to view the plurality of advertisements pushed to the mobile device at one time, in which case advertisements will not be displayed on subsequent unlocking of the mobile device (i.e. the pushed advertisements will have been viewed). If desired, the plurality of advertisements uploaded onto the mobile device may be removed from the mobile device after a predetermined time frame and replaced with a new plurality of advertisements. For example, one set of advertisements may be pushed to the mobile device overnight, some, a substantial portion or all of those advertisements displayed on the mobile device during the course of the following day and the set of advertisements removed from the mobile device on the following night and replaced by a new set of advertisements.

The registration details collected from the user are not particularly limited. These may generally include the usual required fields of name, email address and password. Registration details may also include loyalty program details of the user. For example, these details may include details from loyalty programs such as Frequent Flyer, Flybuys, Everyday Rewards, MyerOne and so on.

The registration details may also include user preferences for subject matter of advertisements to be retrieved from the advertisement library. For example, a user may wish to receive all advertisements, including incentives, for food and beverages, holidays and travel, sporting events, concerts and theatre, automotive and so on.

To facilitate easy navigation past the advertisement displayed on the screen of the mobile device on unlocking of the mobile device, in certain embodiments on display of the advertisement the application software provides a tap through to the homepage of the mobile device.

In order to provide additional functionality, on display of the advertisement the application software may provide a tap through to user options including one or more of save, share, favourites, stop advertiser or block, loyalty programs and on/off.

The save option advantageously facilitates saving of the advertisement. As such, the user can retrieve saved advertisements at a later time or date and consider them in more detail. The advertisements may also include codes, such as barcodes or QR codes that can be scanned to receive an incentive, for example a discount at a store of the advertiser and so on.

The share option may facilitate sharing of the advertisement with contacts of the user, for example via email, SMS, MMS, Facebook, Twitter or other social media. Generally, links will be provided to each form of delivery, or a substantial portion of the forms of delivery, in the usual fashion.

As noted above, saved advertisement may be retrieved for consideration and action at a later time or date. The favourites option facilitates searching for a previously saved advertisement. Once located, the advertisement can be retrieved and considered and, for example, advantage taken of an incentive provided by the advertisement, or action taken to share the advertisement with a contact.

In some instances a user of the system may want to prevent future advertisements from a particular advertiser and so on. The stop advertiser or block option advantageously facilitates blocking of an advertisement retrieved from the advertisement library and/or blocking of advertisements from an advertiser and/or relating to a particular subject matter.

The loyalty programs option may facilitate entry of loyalty programs of the user. In that case, the user can receive loyalty program advertising on the mobile device through the application software. Advertising by loyalty programs may provide incentives such as bonus loyalty points or special loyalty promotions to the user.

In some instances, a user may wish to stop advertisements from being automatically retrieved and displayed on their mobile device on unlocking of the screen to the mobile device. As such, the on/off option may facilitate adding or removing advertisements being retrieved and displayed on the mobile device on unlocking the screen.

The advertisements displayed on the user's mobile device may be selected at random, or following a predetermined sequence. In certain embodiments, advertisements to be displayed on the mobile device are selected on the basis one or more of preloaded user preferences, user demographic and user data collected from the mobile device, such as geo-location and geo-targeting data.

Certain embodiments are to methods for advertising on a mobile device comprising:
  receiving registration details of a user of the mobile device and effecting registration of the user; and
  retrieving an advertisement from an advertisement library stored on a database and displaying the advertisement on a screen of the mobile device,
  wherein the advertisement is displayed on the screen of the mobile device on unlocking of the screen, prior to the display of a homepage of the mobile device.

As discussed herein, the advertisement provides an incentive to the user, for example in return for having the advertisement displayed on unlocking of the screen of the mobile device.

In certain embodiments, when a user opts in to receiving advertisements on unlocking of the screen of their mobile device, the method comprises pushing a plurality of advertisements to the mobile device at a predetermined time, for example overnight. The methods comprise storing the plurality of advertisements on the mobile device and accessing the advertisements each time, a substantial portion of the times or a portion of the times the user unlocks the screen of the device. In certain embodiments, the user can opt to view all, a substantial portion or a portion of the plurality of advertisements pushed to the mobile device at one time, in which case advertisements will not be displayed on subsequent unlocking of the mobile device. Also, in certain embodiments, the method comprises removing the plurality of advertisements from the mobile device after a predetermined time frame and replacing them with a new plurality of advertisements. In certain embodiments, the method comprises pushing a set of advertisements to the mobile device overnight, displaying some or all of the set of advertisements on the mobile device during the course of the following day on unlocking of the screen of the mobile device, removing the set of advertisements from the mobile device on the following night and replacing them with a subsequent set of advertisements. In certain embodiments, the removal of the set of advertisements from the mobile device may only remove a portion of the advertisements or a substantial of the advertisements from the mobile device after a period of time and then replacing or supplementing them with another set of advertisements.

As with the other systems disclosed herein, the registration details may include loyalty program details of the user, or user preferences for subject matter of advertisements to be retrieved from the advertisement library. Combinations of features of the user may also be included in the registration details.

In certain embodiments, the method comprises providing a tap through to the homepage of the mobile device on displaying the advertisement on the mobile device. In certain embodiments, the method further comprises providing a tap through to user options including one or more of the following: save, share, favourites, stop advertiser or block, loyalty programs and on/off on displaying the advertisement on the mobile device. These options are as discussed herein, reference to which is incorporated herein with respect to the one or more of the disclosed method embodiments.

In certain embodiments, the method may also comprise selecting advertisements to be displayed on the mobile device on the basis one or more of the following: preloaded user preferences, user demographic and user data collected from the mobile device, such as geo-location and geo-targeting data. Though, as discussed herein the advertisements may also be selected randomly or in accordance with a predetermined sequence.

Certain embodiments are directed to providing a computer readable medium containing programming instructions that cause a computer processor to perform the steps of:
  receiving registration details of a user of the mobile device and effecting registration of the user; and
  retrieving an advertisement from an advertisement library stored on a database and displaying the advertisement on a screen of the mobile device,
  wherein the advertisement is displayed on the screen of the mobile device on unlocking of the screen, prior to the display of a homepage of the mobile device, and wherein the advertisement provides an incentive to the user.

The disclosed embodiments consists of features and a combination of parts hereinafter fully described and illustrated in the accompanying drawings, it being understood that various changes in the details may be made without departing from the scope of the disclosed embodiments or sacrificing one or more of the advantages of the present disclosure.

BRIEF DESCRIPTION OF ACCOMPANYING DRAWINGS

To further clarify various aspects of some embodiments, a more particular description of certain embodiments is provided by references to specific embodiments thereof, which are illustrated in the appended drawings. It is appreciated that these drawings depict exemplary embodiments and are therefore not to be considered limiting of its scope. The exemplary embodiments are described and explained with additional specificity and detail through the accompanying drawings in which:

FIGS. 1A and 1B illustrate the process flow of an exemplary embodiment of the system.

FIG. 2 illustrates screen displays during an example of a registration process for the system, according to certain embodiments.

FIGS. 3A and 3B illustrate screen displays on unlocking the screen of the mobile device and on launch of application software of the system, according to certain embodiments.

FIG. 4 illustrates screen displays for the share option of the system, according to certain embodiments.

FIG. 5 illustrates screen displays for the favourites option of the system, according to certain embodiments.

DETAILED DESCRIPTION

The present disclosure provides systems and methods for advertising. Certain embodiments relate to systems and methods for advertising on mobile devices where advertisements are displayed on the mobile device on unlocking of the device, prior to display of the homepage of the device.

The present disclosure is described in further detail with reference to one or more embodiments, some examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide further embodiments. The present disclosure covers these variations and embodiments as well as other variations and/or modifications.

Figure 1A:
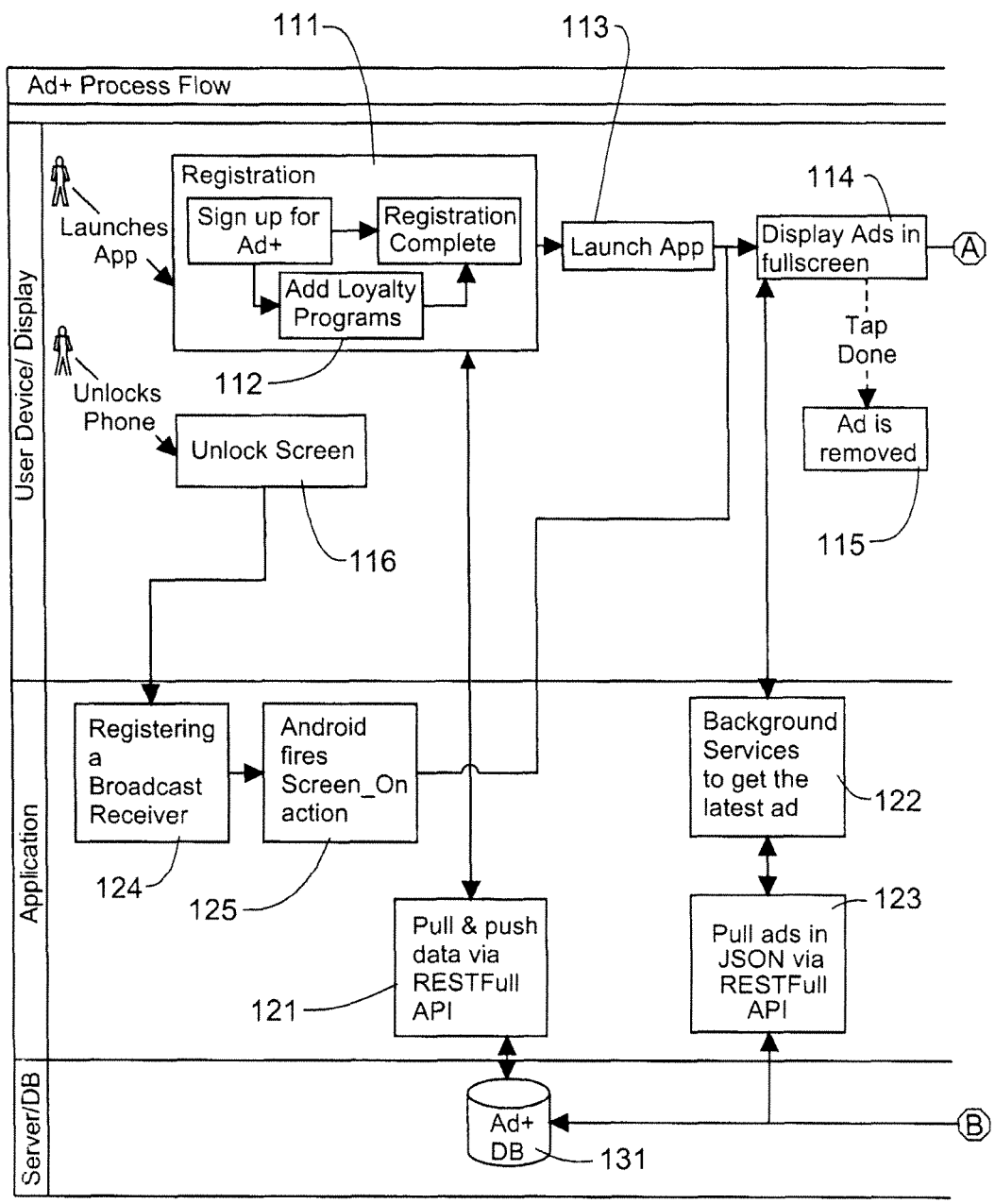
Figure 6:
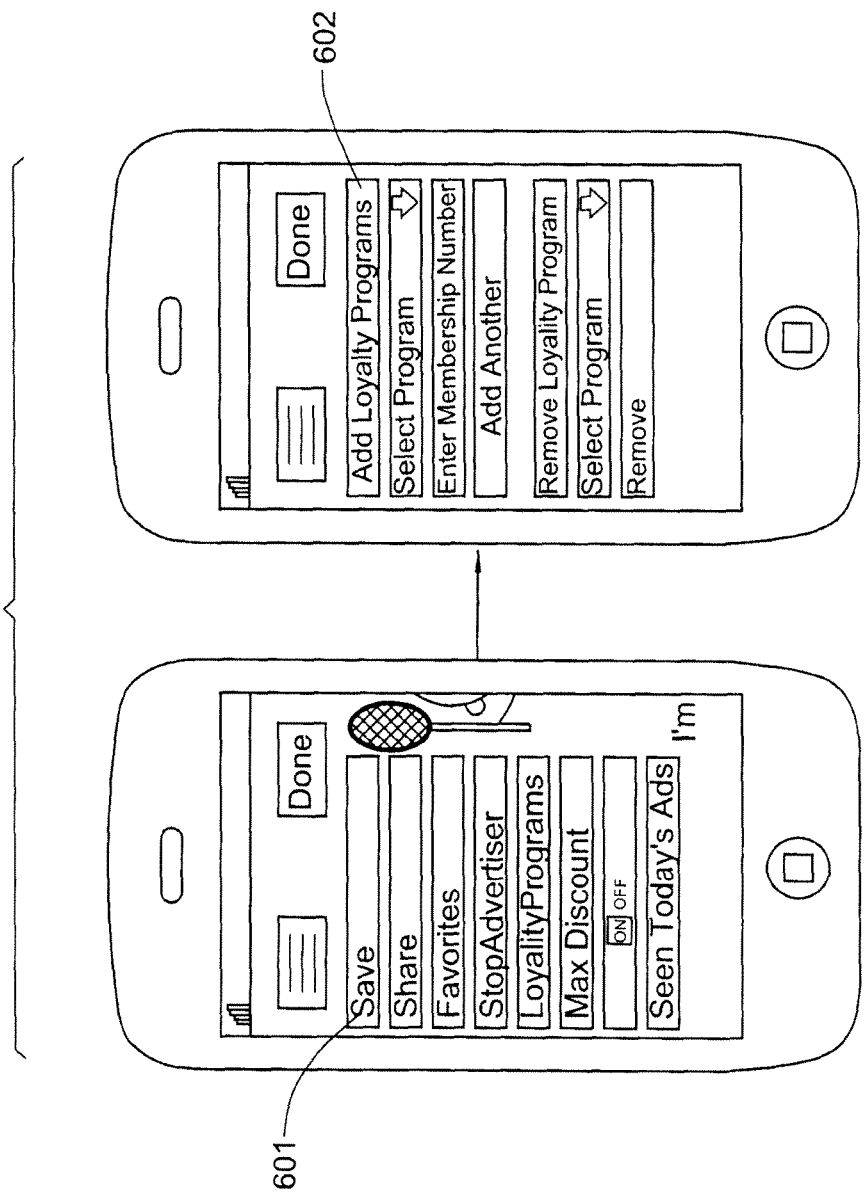
FIG. 6 illustrates screen displays for the loyalty programs option of the system, according to certain embodiments.
Figure 7:
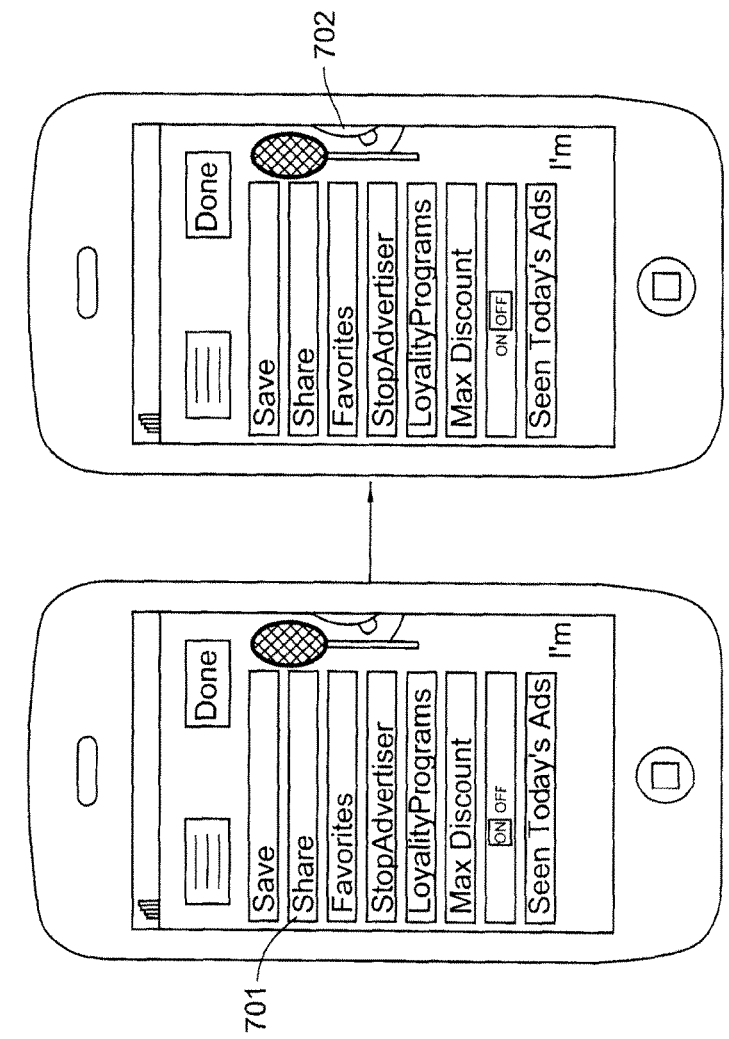
FIG. 7 illustrates screen displays for the on/off option of the system, according to certain embodiments.

Referring to FIGS. 1A and 1B, an exemplary process flow for a system 100 for advertising is illustrated. The process flow for the system 100 may be separated into three components for convenience: a user device 110; application software 120; and a server/database 130.

Referring firstly to the user device 110 component of the process flow of the system 100, a user interface provides for registration 111 of a user of the system 100. The registration 111 may include addition of loyalty programs 112 of the user. If a user of the system 100 registers loyalty program details, the user may receive current communications and offers from their various loyalty programs. As discussed herein, registration 111 may also include collection of information relating to topics of interest to the user. Data collected during registration 111 is transferred 121 by the application software 120 to the database 131 for storage.

On launch 113 of the application software 120 results in retrieval of an advertisement from the database 131 through background services 122 which pulls the advertisement 123 in JSON format via RESTFull API. The advertisement is then displayed 114 in full screen on the user device 110. Once displayed, the user can tap through and the advertisement is removed 115. As illustrated in the following figures, this results in the homepage to the user device 110 being displayed.

Display of advertisements is also triggered by unlocking 116 of the user device 110. It is considered that, on average, a user will unlock 116 their user device 110 between 35-50 times a day. As such, advertisements will be displayed on the user device 110 each time it is unlocked 116. In certain embodiments, the advertisement does not have to be displayed each time and instead the advertisement may be displayed in one or more of the following timings: a portion of the times the user device is unlocked, a substantial portion of the times the user device is unlocked, a predetermined set of times the user device is unlocked or random times the user device is unlocked. This process involves registering a broadcast receiver 124 and firing Screen_On action 125. This results in retrieval of an advertisement from the database 131 through background services 122 which pulls the advertisement 123 in JSON format via RESTFull API. The advertisement is then displayed 114 in full screen on the user device 110. In other exemplary embodiments, advertisements are retrieved from the database 131 and stored on the user device 110 so that they can be accessed by the application software each time the user device 110 is unlocked 116. This speeds up the display 114 of each advertisement on the user device 110 as the advertisements do not need to be retrieved from the database 131 each time the user device 110 is unlocked 116. In certain embodiments, the advertisement does not have to be displayed each time and instead the advertisement may be displayed in one or more of the following timings: a portion of the times the user device is unlocked, a substantial portion of the times the user device is unlocked, a predetermined set of times the user device is unlocked or random times the user device is unlocked.

If a user opts in to having the advertisements displayed on their user device 110 on unlocking of the screen to the user device 110, rather than a single advertisement being retrieved from the database 131 and displayed, a plurality or set of advertisements may be retrieved from the database 131, for example overnight, and stored on the user device 110. The stored advertisements are then access directly from the user device 110 on unlocking of the screen 116 of the user device 110 the following day. As discussed herein, the system 100 may facilitate viewing of all of the advertisements pushed to the user device 110 on one sitting, in which case advertisements may not be displayed on subsequent unlocking of the screen 116 of the user device 110. Also, in that case, a set of advertisements pushed to the device may be removed after a default period of time and replaced with a new set of advertisements. This may advantageously reduce the memory consumed by the application software on the user device 110. In certain embodiments, the system 100 may facilitate viewing of a portion of the advertisements or a substantial portion of the advertisements pushed to the user device 110 on one sitting, in which case advertisements may not be displayed on subsequent unlocking of the screen 116 of the user device 110. However, is certain exemplary embodiments the advertisements, a portion of the advertisements a single advertisement, a plurality of advertisements may be displayed on subsequent unlocking of the screen. Also, in that case, a set of advertisements or a subset of advertisements pushed to the device may be removed after a default period of time and replaced or supplemented with a new set of advertisements. This may advantageously reduce the memory consumed by the application software on the user device 110.

User options 117 can be accessed by the user by tapping through from the display 114 of the advertisement on the user device 110. As discussed herein, and referred to in more detail below, the user options 117 may include a share option 117a for sharing advertisements with contacts, for example via email, SMS, MMS, Facebook or twitter, and a favourites option 117b for marking advertisements as favourites and retrieving favourite advertisements. A loyalty program option 117c may facilitate addition and deletion of user loyalty programs from the user's profile. An on/off option 117d may let the user switch the automatic retrieval and display of advertisements on unlocking of the user device 110 off and on.

A blocking option 118 may also be provided that lets a user block certain advertisers and/or advertised subject matter from their user device 110. If this option is exercised by the user of the user device 110, the advertisement is blocked 126 via RESTFull API and the user profile updated on the database 131.

Referring to FIG. 2, an example of a registration process 200 of the system 100 is illustrated, according to certain embodiments. The registration process 200 involves selecting the application software 201 from the relevant App store and entering user registration details 202. Details of a user's loyalty programs may be entered 203. On launch of the application software an advertisement is displayed 204, including a homepage tap through 205 to the homepage of the user device and an options tap through 206 to user options.

FIGS. 3A and 3B illustrate screen displays on unlocking the screen 301 of the mobile device and on launch of application software 302 of the system, according to certain embodiments. From the locked screen display 303, a user of the device slides to unlock and, on unlocking of the locked screen, an advertisement is displayed 304. The advertisement may be retrieved from the advertisement library on unlocking of the device, or advertisements may be pre-queued. As previously discussed, a user may navigate directly from the advertisement display 304 to their homepage, or they may navigate through to user options display 306. Likewise, on selecting the App from the homepage 305, an advertisement is displayed 304 from which the user may navigate directly to user options display 306.

Referring to FIG. 4, screen displays are illustrated which provide an example of a user options display 401 and selection of a share option display 402, according to certain embodiments. As will be seen from the exemplified share option display 402, the user is given a number of options such as SMS, email, Facebook and Twitter. Additional options may also be provided, for example alternative social media options and so on.

If advertisements have been saved by a user, the user may select "favourites" on the user options display 501, which will result in a favourites option display 502 including the advertisements that have been saved by the user. These may be searchable and/or may be scrolled through to locate a desired advertisement. The desired advertisement may be selected by tapping on the advertisement, resulting in the advertisement display 503.

If the user is associated with one or more loyalty program, such as Frequent Flyer, Flybuys, Everyday Rewards, MyerOne and so on, the user may select a "Loyalty Programs" option on the user option display 601. This will navigate through to a loyalty options display 602 that facilitates entry of relevant loyalty program details of the user. The loyalty options display 602 also includes an option for removal of stored loyalty programs from the user's profile.

In certain exemplary embodiments, a user of the system may want to opt out of receiving advertisements on unlocking of the screen of the user device. As such the user options display 701 may also include an "on/off" option. When in the on position, as illustrated in user options display 701, advertisements are automatically retrieved and displayed on unlocking of the screen. When in the off position, as illustrated in user options display 702, advertisements are not automatically retrieved, but may still be accessed by launching the application software through the App on the user device.

Further advantages of the claimed subject matter will become apparent from the following non-limiting examples describing certain embodiments of the claimed subject-matter:

Example 1A. A System for Advertising on a Mobile Device Comprising
- a user interface facilitating entry of registration details of a user of said system and thereby registration of said user; and
- application software adapted to retrieve an advertisement from an advertisement library stored on a database and display said advertisement on a screen of said mobile device,
- wherein said application software is adapted to display the advertisement on said screen of said mobile device on unlocking of said screen, prior to the display of a homepage of said mobile device.

2A. A system for Advertising on a Mobile Device Comprising
- a user interface facilitating entry of registration details of a user of said system and thereby registration of said user; and
- application software adapted to retrieve a plurality of advertisements from an advertisement library stored on a database and push said plurality of advertisements to the mobile device at a predetermined time and to be stored locally within said mobile device for subsequent display independent of internet connectivity of said mobile device,
- wherein said application software is adapted to display an advertisement of said plurality of advertisements on a screen of said mobile device whereby unlocking of the device is the trigger that activates the system to display said advertisement, prior to the display of a homepage of said mobile device.

3A. A system according to examples 1A or 2A, wherein the advertisement provides an incentive to the user of the system, for example in return for having the advertisement displayed on unlocking of the screen of the mobile device.

4A. A system according to one or more of the proceeding A examples, wherein an advertisement is retrieved from said advertisement library and displayed on said screen on launching said application software.

5A. A system according to one or more of the preceding A examples, wherein when a user opts in to receiving advertisements on unlocking of the screen of their mobile device, a plurality of advertisements are pushed to the mobile device at a predetermined time, for example overnight.

6A. A system according to one or more of the preceding A examples, wherein said application software is adapted to automatically push a plurality of advertisements to the mobile device overnight with no user intervention and to be stored locally on said mobile device for accessibility throughout the following day independent of internet connectivity.

7A. A system according to one or more of the preceding A examples, wherein the plurality of advertisements are stored on the mobile device and accessed each time the user unlocks the screen of the device.

8A. A system according to one or more of the preceding A examples, wherein the user can opt to view all of the plurality of advertisements pushed to the mobile device at one time, in which case advertisements will not be displayed on subsequent unlocking of the mobile device.

9A. A system according to one or more of the preceding A examples, wherein the plurality of advertisements are stored locally on the mobile device and accessed each time the user unlocks the device and/or wherein the user can opt to view all of the plurality of advertisements that are stored locally on the mobile device at one time, in which case advertisements will not be displayed on subsequent unlocking of the mobile device.

10A. A system according to one or more of the preceding A examples, wherein the plurality of advertisements uploaded onto the mobile device are removed from the mobile device after a predetermined time frame and replaced with a new plurality of advertisements.

11A. A system according one or more of the preceding A examples, wherein a set of advertisements is pushed to the mobile device overnight, some or all of the set of advertisements displayed on the mobile device during the course of the following day and the set of advertisements removed from the mobile device on the following night and replaced by a subsequent set of advertisements.

12A. A system according to one or more of the preceding A examples, wherein said registration details include loyalty program details of said user.

13A. A system according to one or more of the preceding A examples, wherein said registration details include user preferences for subject matter of advertisements to be retrieved from said advertisement library.

14A. A system according to one or more of the preceding A examples, wherein on display of said advertisement said application software provides a tap through to said homepage of said mobile device.

15A. A system according to one or more of the preceding A examples, wherein on display of said advertisement said application software provides a tap through to user options including one or more of save, share, favourites, stop advertiser or block, loyalty programs and on/off.

16A. A system according to one or more of the preceding A examples, wherein said save option facilitates saving of said advertisement.

17A. A system according to one or more of the preceding A examples, wherein said share option facilitates sharing of said advertisement with contact via email, SMS, MMS, Facebook, Twitter or other social media.

18A. A system according to one or more of the preceding A examples, wherein said favourites option facilitates searching for a previously saved advertisement.

19A. A system according to one or more of the preceding A examples, wherein said stop advertiser or block option facilitates blocking of an advertisement retrieved from said advertisement library and/or blocking of all advertisements from an advertiser and/or relating to a particular subject matter.

20A. A system according to one or more of the preceding A examples, wherein said loyalty programs option facilitates entry of loyalty programs of said user whereby said user can receive loyalty program advertising on said mobile device through said application software.

21A. A system according to one or more of the preceding A examples, wherein said on/off option facilitates adding or removing advertisements being retrieved and displayed on said mobile device on unlocking said screen.

22A. A system according to one or more of the preceding A examples, wherein advertisements to be displayed on said mobile device are selected on the basis one or more of preloaded user preferences, user demographic and user data collected from said mobile device, such as geo-location and geo-targeting data.

Example 1B. A method for Advertising on a Mobile Device Comprising:
- receiving registration details of a user of said mobile device and effecting registration of said user; and
- retrieving an advertisement from an advertisement library stored on a database and displaying said advertisement on a screen of said mobile device,
- wherein said advertisement is displayed on said screen of said mobile device on unlocking of said screen, prior to the display of a homepage of said mobile device.

2B. A Method for Advertising on a Mobile Device Comprising:
- receiving registration details of a user of said mobile device and effecting registration of said user;
- retrieving a plurality of advertisements from an advertisement library stored on a database and pushing said plurality of advertisements to the mobile device at a predetermined time and to be stored locally within said mobile device for subsequent display independent of internet connectivity of said mobile device; and
- displaying an advertisement of said plurality of advertisements on a screen of said mobile device,
- wherein said advertisement is displayed on said screen of said mobile device whereby unlocking of the device is the trigger that activates the system to display an advertisement, prior to the display of a homepage of said mobile device.

3B. A method according to examples 1B or 2B, wherein the advertisement provides an incentive to the user, for example in return for having the advertisement displayed on unlocking of the screen of the mobile device.

4B. A method according to one or more of the proceeding B examples, wherein when a user opts in to receiving advertisements on unlocking of the screen of their mobile device, said method comprises pushing a plurality of advertisements to the mobile device at a predetermined time, for example overnight.

5B. A method according to one or more of the proceeding B examples, comprising storing said plurality of advertisements on the mobile device and accessing said advertisements each time the user unlocks the screen of the device.

6B. A method according to one or more of the proceeding B examples, wherein the user can opt to view all of the plurality of advertisements pushed to the mobile device at one time, in which case advertisements will not be displayed on subsequent unlocking of the mobile device.

7B. A method according to one or more of the proceeding B examples, comprising: removing the plurality of advertisements from the mobile device after a predetermined time frame and replacing them with a new plurality of advertisements.

8B. A method according to one or more of the proceeding B examples, comprising: pushing a set of advertisements to the mobile device overnight, displaying some or all of the set of advertisements on the mobile device during the course of the following day on unlocking of the screen of said mobile device, removing the set of advertisements from the mobile device on the following night and replacing them with a subsequent set of advertisements.

9B. A method according to one or more of the proceeding B examples, wherein said registration details include loyalty program details of said user.

10B. A method according to one or more of the proceeding B examples, wherein said registration details include user preferences for subject matter of advertisements to be retrieved from said advertisement library.

11B. A method according to one or more of the proceeding B examples, comprising providing a tap through to said homepage of said mobile device on displaying said advertisement on said mobile device.

12B. A method according to one or more of the proceeding B examples, comprising providing a tap through to user options including one or more of save, share, favourites, stop advertiser or block, loyalty programs and on/off on displaying said advertisement on said mobile device.

13B. A method according to one or more of the proceeding B examples, wherein said save option facilitates saving of said advertisement.

14B. A method according to one or more of the proceeding B examples, wherein said share option facilitates sharing of said advertisement with contact via email, SMS, MMS, Facebook, Twitter or other social media.

15B. A method according to one or more of the proceeding B examples, wherein said favourites option facilitates searching for a previously saved advertisement.

16B. A method according to one or more of the proceeding B examples, wherein said stop advertiser or block option facilitates blocking of an advertisement retrieved from said advertisement library and/or blocking of all advertisements from an advertiser and/or relating to a particular subject matter.

17B. A method according to one or more of the proceeding B examples, wherein said loyalty programs option facilitates entry of loyalty programs of said user whereby said user can receive loyalty program advertising on said mobile device through said application software.

18B. A method according to one or more of the proceeding B examples, wherein said on/off option facilitates adding or removing advertisements being retrieved and displayed on said mobile device on unlocking said screen.

19B. A method according to one or more of the proceeding B examples, comprising: selecting advertisements to be displayed on said mobile device on the basis one or more of preloaded user preferences, user demographic and user data collected from said mobile device, such as geo-location and geo-targeting data.

Example 1C. A computer Readable Medium Containing Programming Instructions that Cause a Computer Processor to Perform the Steps of:
- receiving registration details of a user of said mobile device and effecting registration of said user; and
- retrieving an advertisement from an advertisement library stored on a database and displaying said advertisement on a screen of said mobile device,
- wherein said advertisement is displayed on said screen of said mobile device on unlocking of said screen, prior to the display of a homepage of said mobile device.

Example 2C. A computer readable medium containing programming instructions according to Example C1 comprise one or more of the limitations of the proceeding B and/or C examples.

Unless the context requires otherwise or specifically stated to the contrary, integers, steps or elements of the invention recited herein as singular integers, steps or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

Additionally, the disclosure has been described with reference to particular exemplary embodiments. However, it may be readily apparent to those skilled in the art that it is possible to embody the disclosure in specific forms other than those of the embodiments described herein. The embodiments are merely illustrative and should not be considered restrictive. The scope of the disclosure is given by the appended claims, rather than the preceding description, and variations and equivalents that fall within the range of the claims are intended to be embraced therein.

The invention claimed is:

1. A mobile device for displaying advertisements, the mobile device comprising:
a display;
a memory for storing programming instructions, registration details, and a plurality of advertisements; and
a processor that executes the programming instructions stored in the memory to cause the mobile device to perform operations comprising:
receiving registration details of a user of the mobile device inputted by the user via a user interface;
storing the received registration details of the user;
receiving the plurality of advertisements in a JSON format via a RESTFull API, the plurality of advertisements being received by the mobile device from a remote advertisement library at a predetermined time;
storing the plurality of advertisements in the memory;
detecting a first input from the user to unlock the display;
displaying one of the plurality of advertisements stored in the memory on the screen of the mobile device prior to the display of a homepage of the mobile device;
removing the one of the plurality of advertisements from the mobile device in response to a tap through indication from the user;
receiving a user selection to view all of the plurality of advertisements received by the mobile device at one time prior to the display of the homepage of the mobile device;
detecting a second input from the user to unlock the display;
displaying all of the plurality of advertisements received by the mobile device at one time after the detection of the second input and prior to the display of the homepage of the mobile device;
detecting a third input from the user to unlock the display, wherein the third input is subsequent to the second input; and
displaying the homepage of the mobile device after the detection of the third input without displaying any advertisement.

2. The mobile device according to claim 1, wherein the advertisement provides an incentive to the user of the mobile device, wherein the incentive is one of a discount, loyalty reward or giveaway.

3. The mobile device according to claim 1, wherein the plurality of advertisements are stored on the mobile device and accessed each subsequent time after the user unlocks the screen of the device after the third input.

4. The mobile device according to claim 1, wherein the plurality of advertisements uploaded onto the mobile device are removed from the mobile device after a predetermined time frame and replaced with a new plurality of advertisements.

5. The mobile device according to claim 1, wherein the registration details include loyalty program details of said user.

6. The mobile device according to claim 1, wherein said registration details include user preferences for subject matter of advertisements to be retrieved from the advertisement library.

7. The mobile device according to claim 1, wherein on display of the advertisement the application software provides a tap through to the homepage of the mobile device.

8. The mobile device according to claim 1, wherein on display of said advertisement said application software provides a tap through to user options including one or more of save, share, favourites, stop advertiser or block, loyalty programs and on/off.

9. The mobile device according to claim 8, wherein the share option facilitates sharing of the advertisement with contacts via email, SMS, MMS, Facebook, Twitter or other social media.

10. The mobile device according to claim 8, wherein the favourites option facilitates searching for a previously saved advertisement.

11. The mobile device according to claim 8, wherein the stop advertiser or block option facilitates blocking of an advertisement retrieved from the advertisement library and/or blocking of all advertisements from an advertiser and/or relating to a particular subject matter.

12. The mobile device according to claim 8, wherein the loyalty programs option facilitates entry of loyalty programs of the user whereby the user can receive loyalty program advertising on the mobile device through the application software.

13. The mobile device according to claim 8, wherein the on/off option facilitates adding or removing advertisements being retrieved and displayed on the mobile device on unlocking the screen.

14. The mobile device according to claim 1, wherein advertisements to be displayed on the mobile device are selected on the basis one or more of preloaded user preferences, user demographic, user data collected from said mobile device, geo-location and geo-targeting data.

* * * * *